(12) United States Patent
Chung

(10) Patent No.: US 7,955,084 B2
(45) Date of Patent: Jun. 7, 2011

(54) WIRELESS TRANSMITTER WITH SECURELY ADJUSTABLE PIVOTAL PLUG FOR CONNECTING TO MUSICAL INSTRUMENT

(75) Inventor: Ming-Cheng Chung, Taichung (TW)

(73) Assignee: JTS Professional Co., Ltd., Taichung (TW)

( * ) Notice: Subject to any disclaimer, the term of this patent is extended or adjusted under 35 U.S.C. 154(b) by 100 days.

(21) Appl. No.: 12/588,233

(22) Filed: Oct. 8, 2009

(65) Prior Publication Data

US 2011/0086519 A1    Apr. 14, 2011

(51) Int. Cl.
*H01R 13/44*    (2006.01)
(52) U.S. Cl. ............... 439/31; 439/131; 439/916
(58) Field of Classification Search ............ 439/31, 439/131, 165, 916
See application file for complete search history.

(56) References Cited

U.S. PATENT DOCUMENTS

| | | | | |
|---|---|---|---|---|
| 5,018,204 A * | 5/1991 | Christian | ................. | 381/74 |
| 5,179,590 A * | 1/1993 | Wang | ................. | 379/454 |
| 5,414,770 A * | 5/1995 | Wang | ................. | 379/446 |
| 5,419,707 A * | 5/1995 | Kelley | ................. | 439/21 |
| 5,829,993 A * | 11/1998 | Wu | ................. | 439/131 |
| 5,967,807 A * | 10/1999 | Wu | ................. | 439/131 |
| 6,138,041 A * | 10/2000 | Yahia | ................. | 455/569.2 |
| 6,317,497 B1 * | 11/2001 | Ou | ................. | 379/454 |
| 6,551,142 B2 * | 4/2003 | Eisenbraun | ................. | 439/668 |
| 6,619,969 B2 * | 9/2003 | Scheider et al. | ................. | 439/131 |
| 6,687,513 B1 * | 2/2004 | Hsu Li | ................. | 455/557 |
| 6,923,686 B1 * | 8/2005 | Cheng | ................. | 439/668 |
| 7,012,403 B2 * | 3/2006 | Hwang | ................. | 320/107 |
| 7,264,479 B1 * | 9/2007 | Lee | ................. | 439/39 |
| 7,292,823 B2 * | 11/2007 | Kuo | ................. | 455/41.2 |
| 7,438,574 B2 * | 10/2008 | Neumann | ................. | 439/172 |
| 2002/0187816 A1 * | 12/2002 | Ou | ................. | 455/569 |

* cited by examiner

*Primary Examiner* — Neil Abrams
(74) *Attorney, Agent, or Firm* — Bacon & Thomas, PLLC

(57) ABSTRACT

A battery-powered wireless transmitter for connecting to a musical instrument comprising an antenna; a cover comprising a well at one end and a first gear on one side of the well; a T-shaped plug having a horizontal section pivotably disposed in the well and a vertical section projecting out of the well, the plug comprising a spring member at one end of the horizontal section, a second gear on the other end of the horizontal section being urged by the spring member to mesh with the first gear, and an electrically conductive rod projecting out of the vertical section; and an adapter comprising an end socket. Pivoting the rod about the horizontal section by rotating the second gear about the fixed first gear will adjust an angle of the plug with respect to the cover and fix the angle after stopping the pivoting.

4 Claims, 8 Drawing Sheets

WIRELESS TRANSMITTER WITH SECURELY ADJUSTABLE PIVOTAL PLUG FOR CONNECTING TO MUSICAL INSTRUMENT

BACKGROUND OF THE INVENTION

1. Field of Invention

The invention relates to wireless transmitters and more particularly to such a wireless transmitter having a pivotal plug adapted to connect to a musical instrument (e.g., an electrical guitar or a saxophone) and adapted to fix after being pivotably adjusted.

2. Description of Related Art

For a conventional electrical guitar, a cable has two ends connected to a socket of the electrical guitar and an amplifier respectively. Sound played by the electrical guitar thus can be amplified by the amplifier. However, the well known wire connection has increasingly been replaced by wireless transmission because it is not convenient in installation, not space saving, and not visually attractive.

There have been numerous suggestions in prior patents for wireless transmission for a musical instrument. For example, U.S. Pat. No. 6,619,969 discloses a plug for connecting a musical instrument to an amplifier.

However, the patent suffers from several disadvantages. For example, the spring-biased plug can be pivoted an angle relative to an electrical device (e.g., radio transmitter) due to the elastic nature thereof rather than being fixed thereat after the adjustment. Moreover, the plug can only be applied to electrical guitars for sound amplification rather than other kinds of musical instrument. Thus, the need for improvement still exists.

SUMMARY OF THE INVENTION

It is therefore one object of the invention to provide a wireless transmitter having a pivotal plug adapted to connect to a musical instrument such as an electrical guitar or a saxophone and adapted to fix after being pivotably adjusted.

The above and other objects, features and advantages of the invention will become apparent from the following detailed description taken with the accompanying drawings.

DETAILED DESCRIPTION OF THE INVENTION

Figure 1:
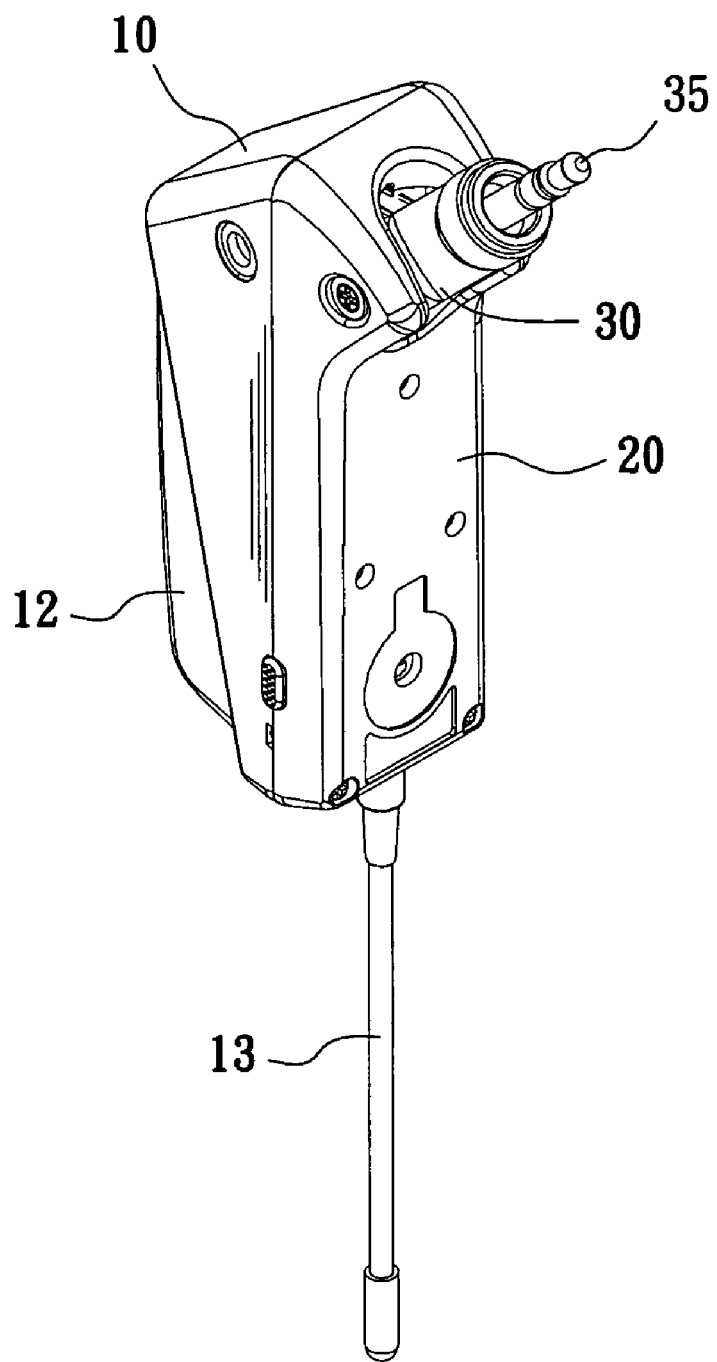
FIG. 1 is a perspective view of a preferred embodiment of wireless transmitter according to the invention.
Figure 2:
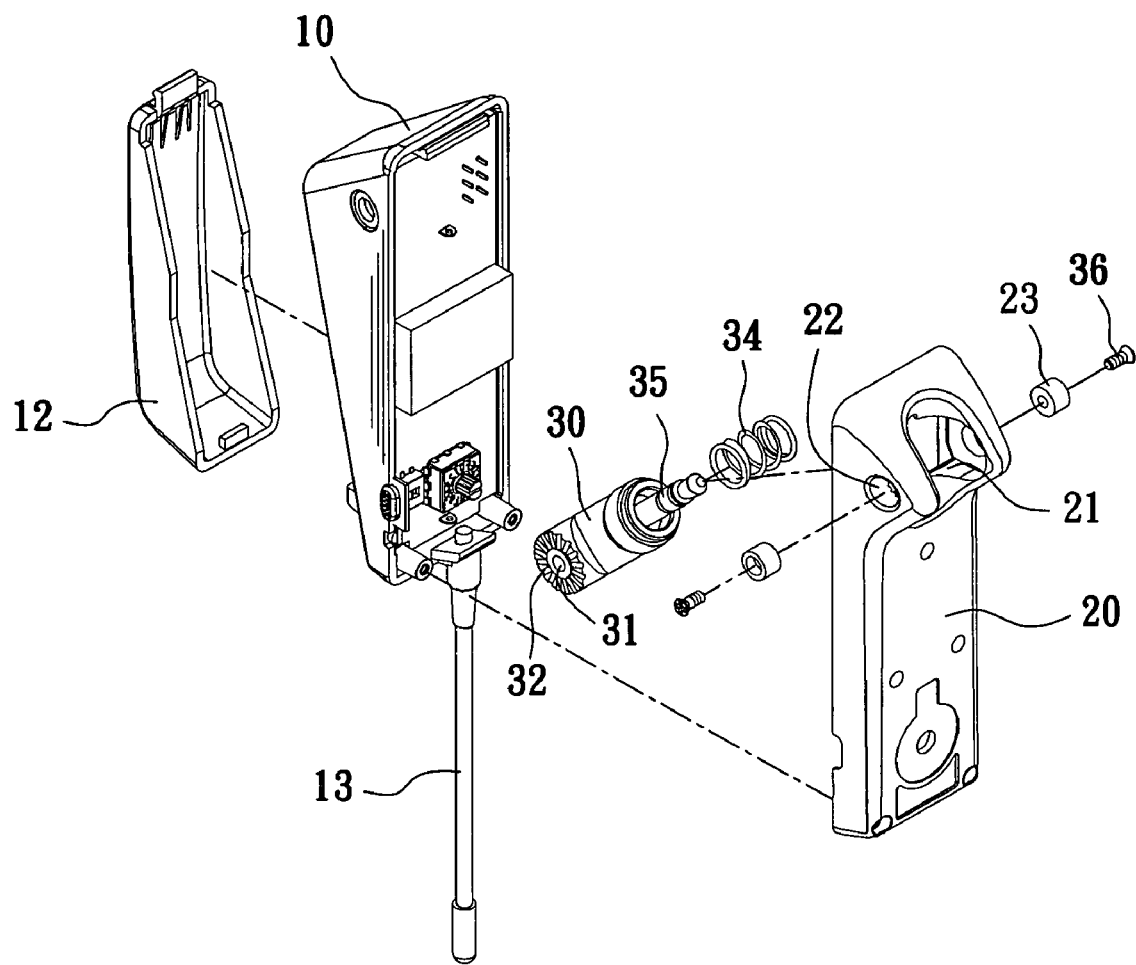
FIG. 2 is an exploded view of the wireless transmitter.
Figure 3:
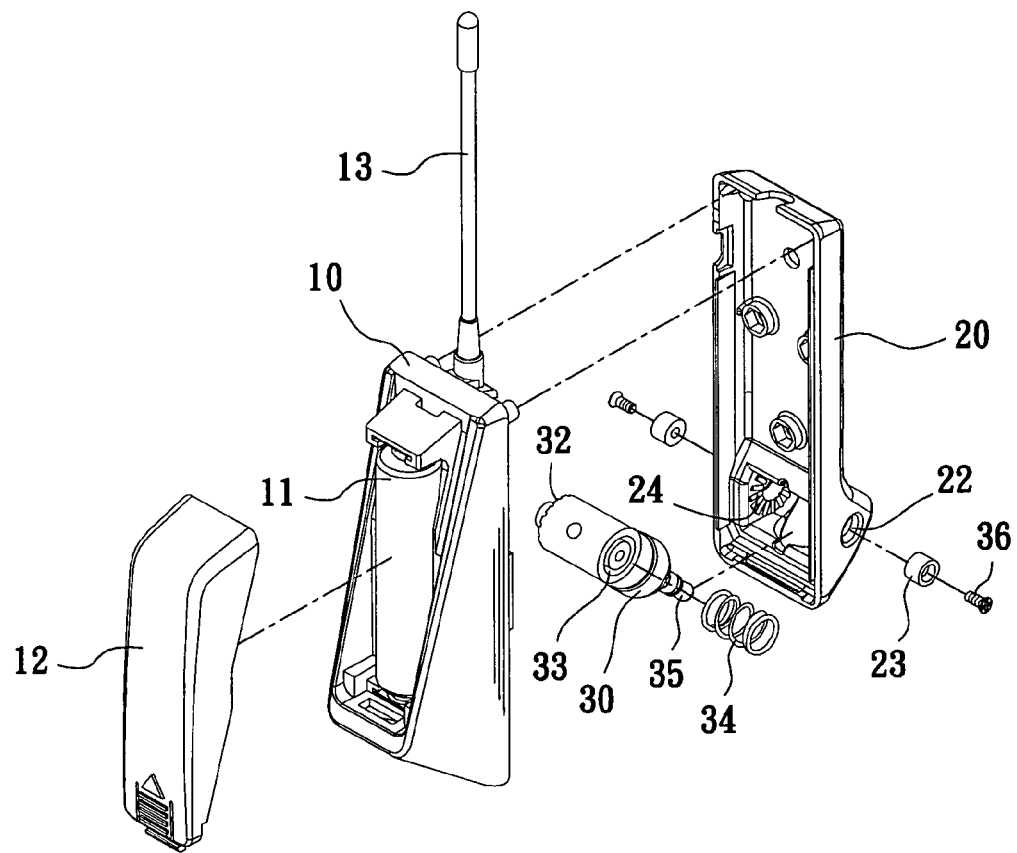
FIG. 3 is another exploded view of the wireless transmitter.
Figure 4:
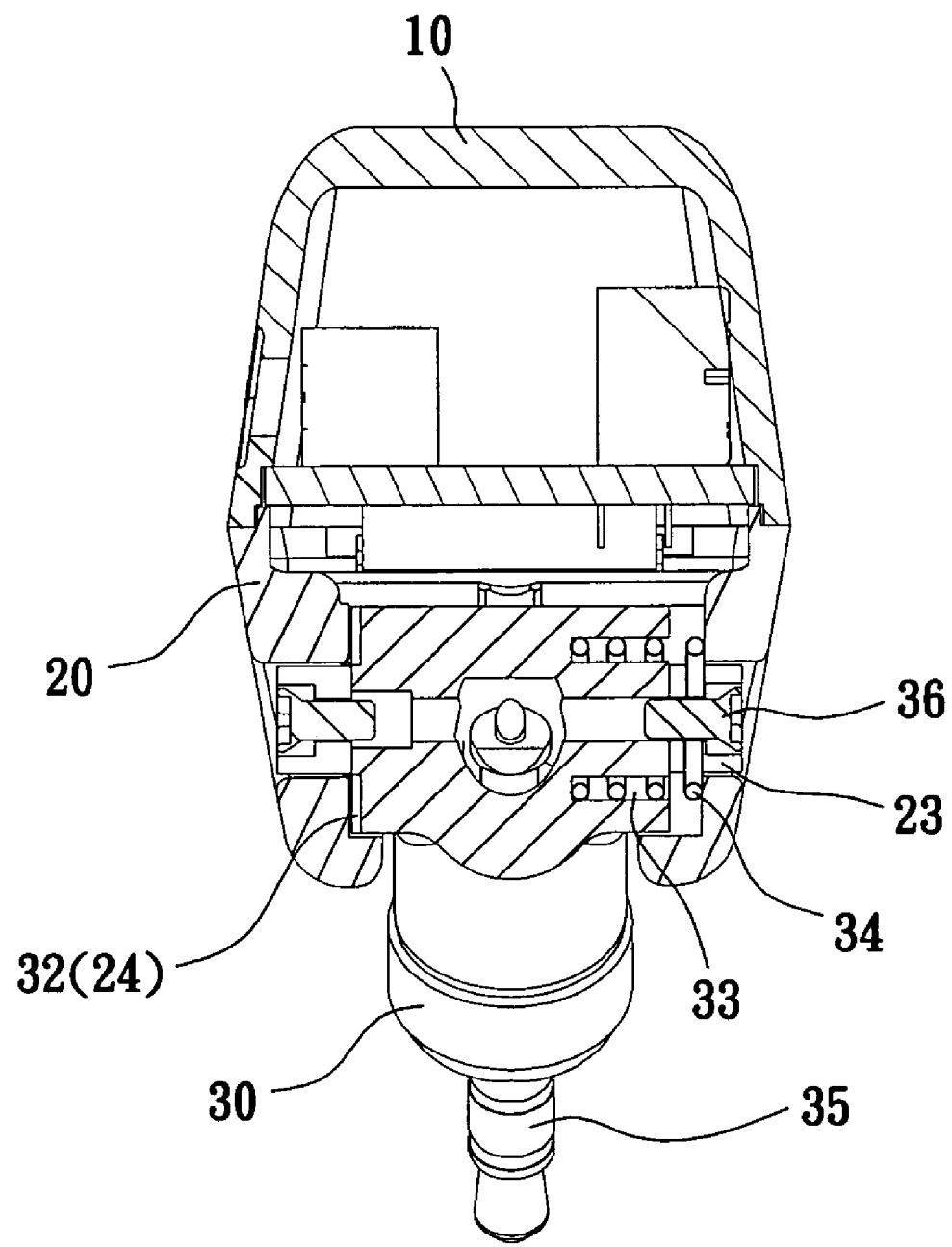
FIG. 4 is a sectional view taken along an upper portion of FIG. 1.
Figure 5:
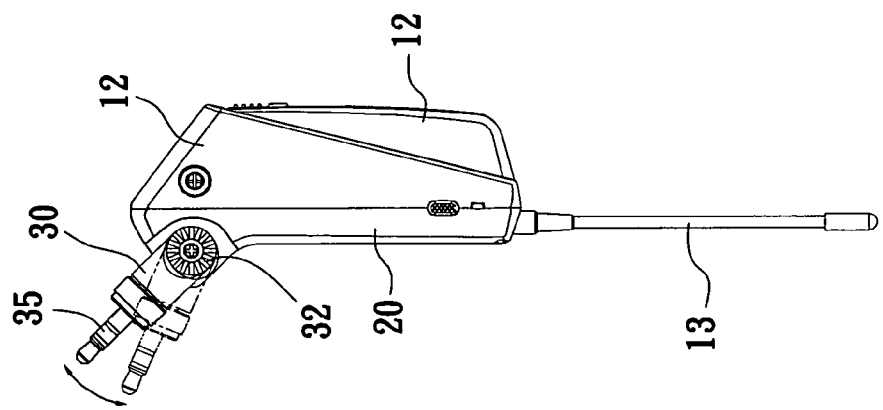
FIG. 5 is a side elevation showing a first pivot angle adjustment of the wireless transmitter.
Figure 6:
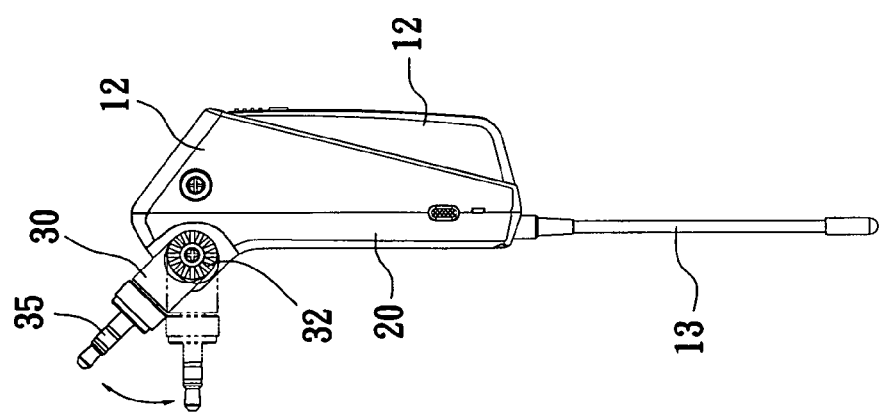
FIG. 6 is a side elevation showing a second pivot angle adjustment of the wireless transmitter.
Figure 7:
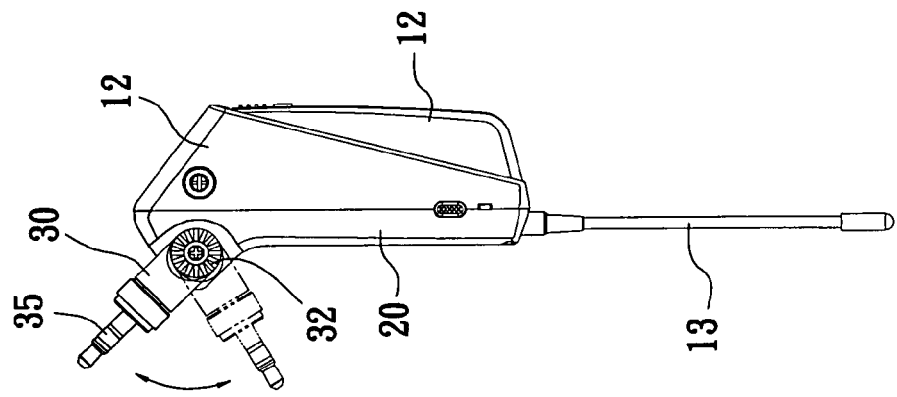
FIG. 7 is a side elevation showing a third pivot angle adjustment of the wireless transmitter.
Figure 8:
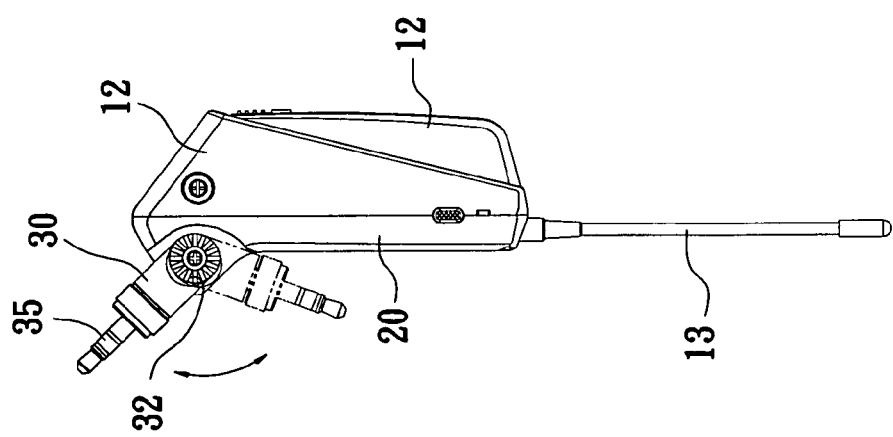
FIG. 8 is a side elevation showing a fourth pivot angle adjustment of the wireless transmitter.

Referring to FIGS. 1 to 10, a wireless transmitter in accordance with a preferred embodiment of the invention comprises a body 10, a cover 20, a plug 30, and an adapter 40. Each of above components will now be described in detail below.

The body 10 comprises a back 12 for releasably covering an electronic assembly 11 including a battery, a circuit board, etc. housed in the body 10. The body 10 further comprises an antenna 13 for wireless signal transmission to an external loudspeaker (not shown). The construction of the body 10, components housed therein, and the antenna 13 are well known in the art and a detailed description thereof is therefore deemed unnecessary.

The rectangular, plate-shaped cover 20 is adapted to releasably cover the front of the body 10 and comprises a well 21 at one end, two opposite openings 22 at both sides of the well 21 respectively, two bushing members 23 inserted into the openings 22 respectively, and a gear 24 formed around the inner mouth of the opening 22.

The plug 30 is T-shaped and comprises two threaded holes 31 at both ends of the horizontal section, a gear 32 formed around the mouth of one hole 31, the gear 32 being adapted to be in mesh with the gear 24, a spring receptacle 33 formed around the other hole 31, a helical spring 34 disposed in the spring receptacle 33, and an electrically conductive rod 35 projecting out of the end of the vertical section of the plug 30, the rod 35 being adapted to insert into a socket of an adapter 40 as detailed later.

An assembly of the plug 30 and the cover 20 will be described in detail below. Dispose the horizontal section of the plug 30 in the well 21 to be aligned with the openings 22. Next, drive two screws 36 through the bushing members 23 to threadedly secure to the threaded holes 31 respectively. Next, insert the spring 34 into the spring receptacle 33. Next, snap the cover 20 onto the body 10 so that the spring 34 may urge the gear 32 to mesh with the gear 24. Finally, drive screws (not shown) through the cover 20 into the body 10 for fastening them together.

Referring to FIGS. 5 to 8 specifically, a person may use his or her hand to pivot the rod 35 about an axis of rotation (i.e., the straight line passing the screws 36) by rotating the gear 32 about the fixed gear 24. As a result, an angle of the plug 30 with respect to the cover 20 is adjusted as indicated by a two-head arrow. Advantageously, the adjusted angle of the plug 30 with respect to the cover 20 can be fixed after releasing the hand. It is also advantageously that a plurality of angles of the plug 30 with respect to the cover 20 can be obtained by adjustment in such a manner.

Figure 9:
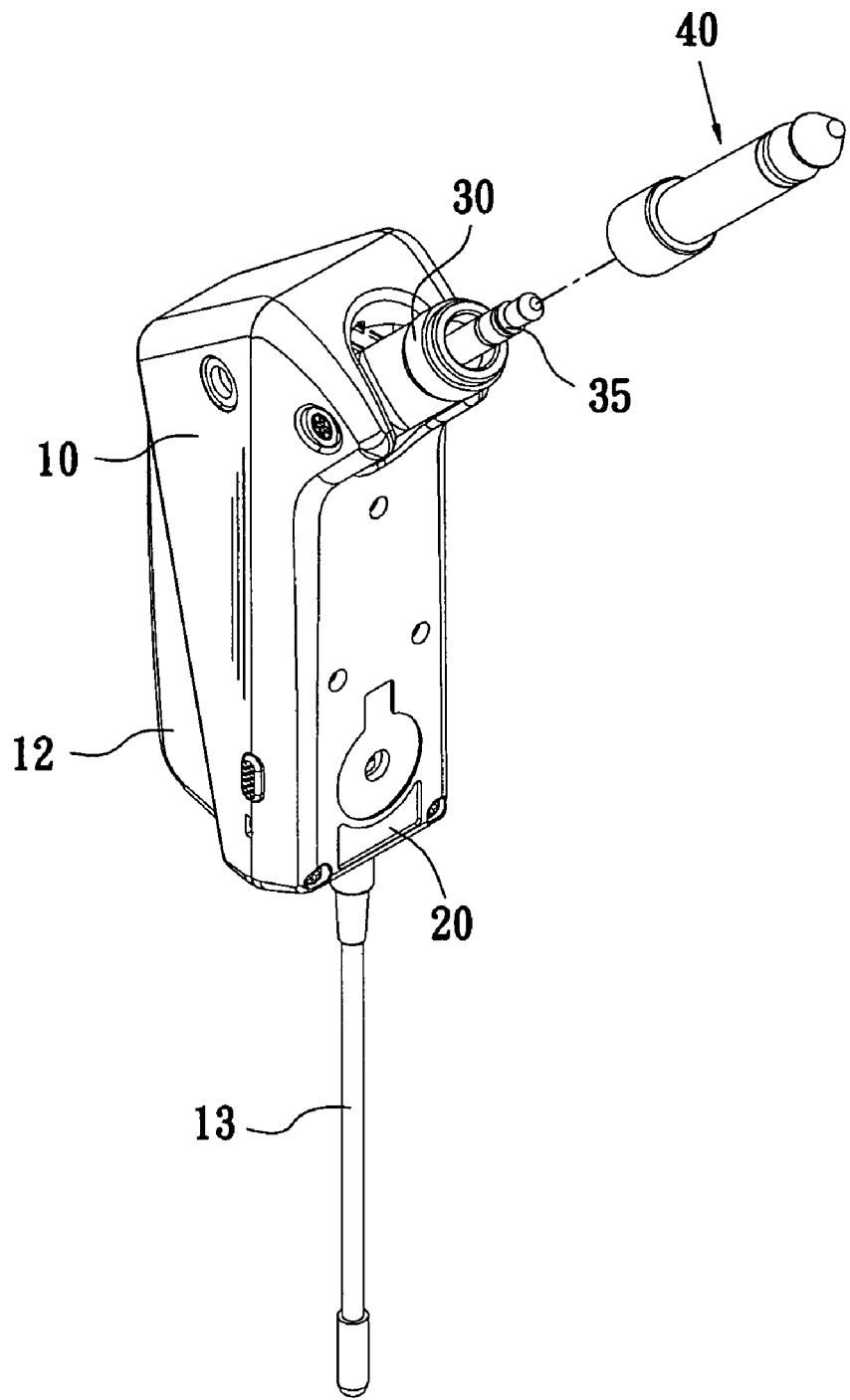
FIG. 9 is a perspective view of the wireless transmitter to be connected to an adapter for an electrical guitar.

Referring to FIG. 9 specifically, the adapter 40 is stepped-diameter cylindrical and has an approximately mushroom-shaped part (not numbered) at one end adapted to insert into a complementary socket formed on a musical instrument (e.g., an electrical guitar) and a socket (not numbered) at the other end adapted to matingly engage with an approximately mushroom-shaped end of the rod 35. As a result, sound played by the electrical guitar can be transmitted to an external loudspeaker (not shown) for amplification through the wireless transmitter.

Figure 10:
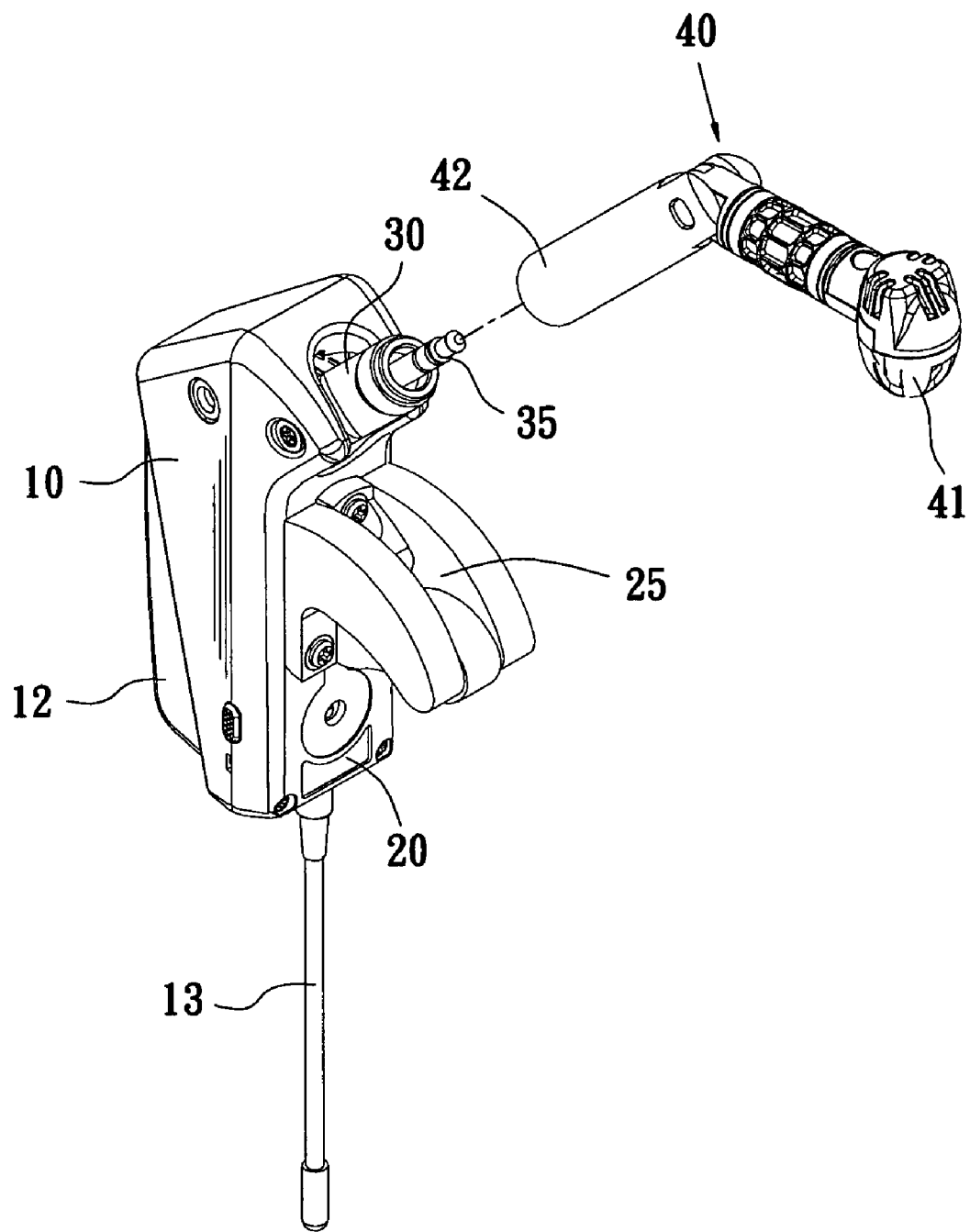
FIG. 10 is a perspective view of another preferred embodiment of wireless transmitter to be connected to an adapter for a saxophone.

Referring to FIG. 10 specifically, another preferred embodiment of the wireless transmitter is shown. Another embodiment is identical to that described above, except that a cradle 25 is mounted on the cover 20. A musical instrument (e.g., saxophone) can be fastened by the cradle 25. The adapter 40 is cylindrical and has a microphone 41 pivotably mounted at one end and a socket 42 at the other end adapted to matingly engage with the rod 35. As a result, sound played by the saxophone can be transmitted to an external loudspeaker (not shown) for amplification through the microphone 41 and the wireless transmitter.

While the invention herein disclosed has been described by means of specific embodiments, numerous modifications and variations could be made thereto by those skilled in the art without departing from the scope and spirit of the invention set forth in the claims.

What is claimed is:

1. A battery-powered wireless transmitter for connecting to a musical instrument, comprising:

an antenna;

a releasable cover comprising a well at one end and a first gear on one side of the well;

a T-shaped plug having a horizontal section pivotably disposed in the well and a vertical section projecting out of the well, the plug comprising spring means at one end of the horizontal section, a second gear on the other end of the horizontal section being urged by the spring means to be in mesh with the first gear, and an electrically conductive rod projecting out of one end of the vertical section; and an adapter comprising a socket at one end, whereby pivoting the rod about the horizontal section by rotating the second gear about the fixed first gear will adjust an angle of the plug with respect to the cover and fix the angle after stopping pivoting the rod about the horizontal section.

2. The battery-powered wireless transmitter of claim 1, further comprising a receptacle at one end of the horizontal section, and wherein the spring means is a helical spring disposed in the receptacle.

3. The battery-powered wireless transmitter of claim 1, wherein the musical instrument is an electrical guitar and wherein the other end of the adapter is formed with an approximately mushroom-shaped part adapted to insert into a socket of the electrical guitar.

4. The battery-powered wireless transmitter of claim 1, wherein the musical instrument is a saxophone, wherein the cover further comprises a cradle for fastening the saxophone, and wherein the other end of the adapter is formed with a pivotal microphone.

* * * * *